(12) United States Patent
Ishida et al.

(10) Patent No.: US 8,046,145 B2
(45) Date of Patent: Oct. 25, 2011

(54) VEHICLE DRIVE CONTROL DEVICE

(75) Inventors: Yasuhito Ishida, Toyokawa (JP); Gen Inoue, Susono (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 382 days.

(21) Appl. No.: 12/274,144

(22) Filed: Nov. 19, 2008

(65) Prior Publication Data

US 2009/0132138 A1    May 21, 2009

(30) Foreign Application Priority Data

Nov. 21, 2007   (JP) ................................ 2007-302257

(51) Int. Cl.
G06F 19/00    (2011.01)
(52) U.S. Cl. .......................................... 701/70; 180/244
(58) Field of Classification Search .................... 701/70, 701/93, 96, 91, 301, 83, 84, 48, 22, 25; 180/170, 180/197, 168, 179, 65, 244; 342/71; 340/903; 318/432
See application file for complete search history.

(56) References Cited

U.S. PATENT DOCUMENTS

| | | | |
|---|---|---|---|
| 6,311,122 B1 * | 10/2001 | Higashimata | 701/96 |
| 6,370,470 B1 * | 4/2002 | Yamamura et al. | 701/96 |
| 2003/0154014 A1 * | 8/2003 | Iwata et al. | 701/93 |
| 2003/0236624 A1 * | 12/2003 | Kimura et al. | 701/301 |
| 2004/0215385 A1 | 10/2004 | Aizawa et al. | |
| 2007/0150158 A1 * | 6/2007 | Inoue et al. | 701/93 |

FOREIGN PATENT DOCUMENTS

JP    2004-090679 A    3/2004

* cited by examiner

*Primary Examiner* — Thomas Black
*Assistant Examiner* — Marthe Marc-Coleman
(74) *Attorney, Agent, or Firm* — Buchanan Ingersoll & Rooney PC

(57) ABSTRACT

A vehicle drive control device includes a target driving torque value control means, a target braking torque value control means, and an automatic drive control means for controlling the target driving torque value control means and the target braking torque value control means through a control signal, for executing an automatic drive control by sending the control signal to the target driving torque value control means and the target braking torque value control means in order to execute a feedback control on a present vehicle speed and for continuously executing the automatic drive control, wherein the target driving torque value control means controls the target value of an actual driving torque to be smaller than an presumed target value of the driving torque calculated by presuming the target value of the braking torque to be zero, for a predetermined time after the cancellation of the braking operation.

10 Claims, 3 Drawing Sheets

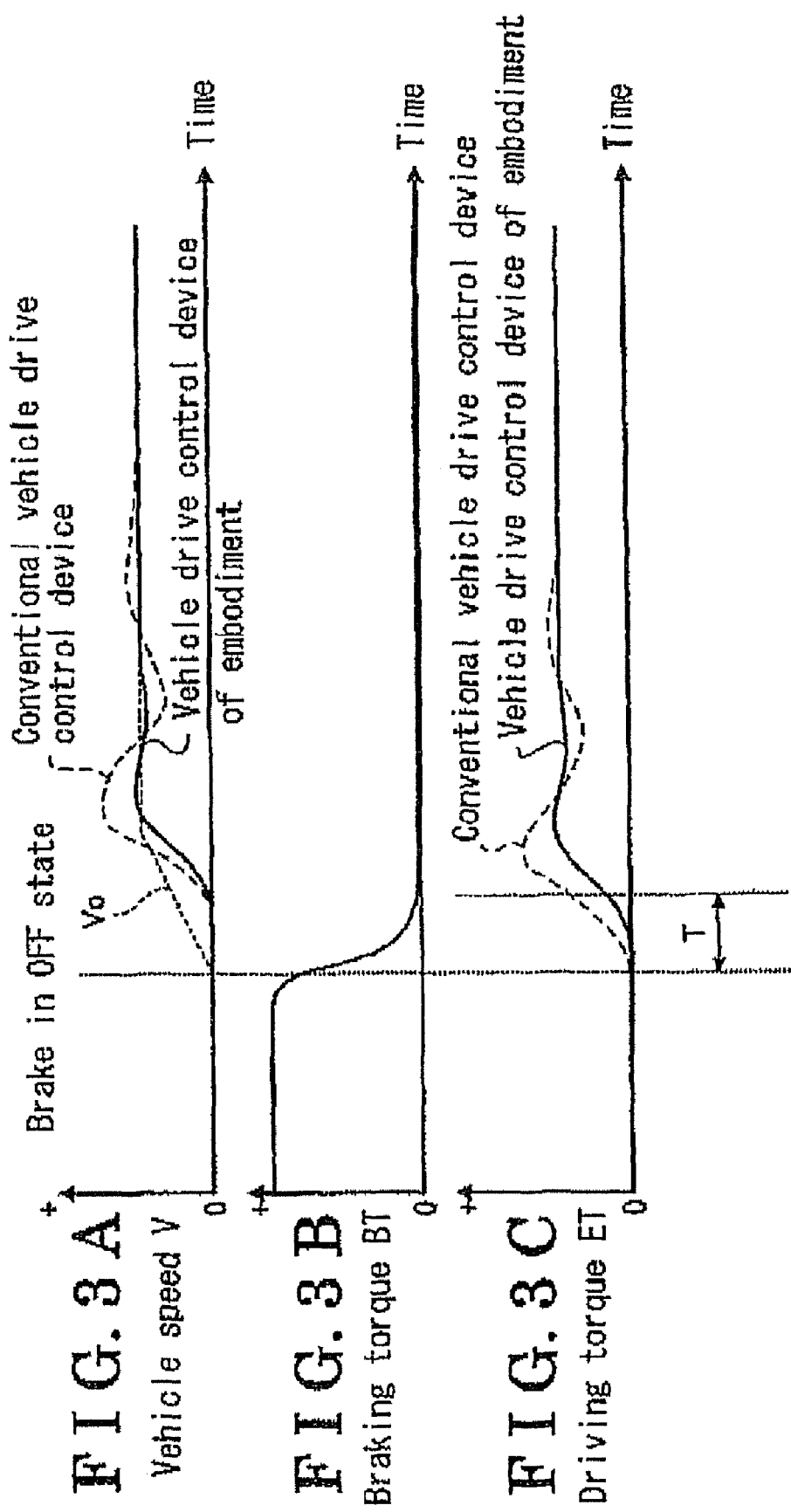

VEHICLE DRIVE CONTROL DEVICE

CROSS REFERENCE TO RELATED APPLICATIONS

This application is based on and claims priority under 35 U.S.C. §119 to Japanese Patent Application 2007-302257, filed on Nov. 21, 2007, the entire contents of which is incorporated herein by reference.

FIELD OF THE INVENTION

The present invention relates to a vehicle drive control device.

BACKGROUND

In order to reduce an operation of a vehicle by a driver, a vehicle drive control device for executing an automatic drive control, such as a cruise control for executing a constant vehicle speed control by which a vehicle speed is controlled to reach a target vehicle speeds an adaptive cruise control (ACC) by which the vehicle is controlled so as to follow a vehicle traveling in front of the subject vehicle and the like, is adapted to the vehicles. In the vehicle drive control device, an engine functioning as a driving torque generating device, which generates a driving torque, and a brake device generating a braking torque are cooperatively controlled so that the vehicle is driven at a preset target vehicle speed. Further, according to the vehicle drive control device, an automatic drive control electronic control unit (hereinafter referred to as ECU) calculates a target driving torque so that the vehicle speed reaches the target vehicle speed. The calculated target driving torque is outputted to an engine ECU, then the engine ECU controls the engine based on the target driving torque. Moreover, according to the vehicle drive control device, the automatic drive control ECU calculates a target braking torque so that the vehicle speed reaches the target vehicle speed. The calculated braking torque is outputted to a brake ECU, then the brake ECU controls the braking device based on the target braking torque.

A conventional automatic drive control for controlling the vehicle to be driven at a low target speed, for example, equal to or less than 10 km/h is known. For instance, according to a known vehicle drive control device disclosed in JP2004-90679A (which is hereinbelow referred to as a reference 1), the automatic drive control is executed so as to control the vehicle to be driven at a target speed as low as a creep speed. According to the conventional vehicle drive control device disclosed in reference 1, even though the driver operates a brake, the automatic drive control is not canceled and remains to be executed. According to the conventional vehicle drive control device, for example, when the driver operates the brake, the automatic drive control is executed so the engine does not generate the driving torque.

On the other hand, when the driver cancels the braking operation, the vehicle drive control device executes the automatic drive control so that the engine generates the driving torque to drive the vehicle at the target speed. In other words, when the driver cancels the braking operation, the vehicle drive control device increases the driving torque which is generated by the engine so as to control the vehicle speed to reach the target speed. The brake device generates friction as the braking torque by contacting pads with rotors by an application of, for example a hydraulic pressure of the wheel cylinders. Therefore, when the driver cancels the braking operation in a condition in which the braking torque is generated by the hydraulic pressure of the wheel cylinders in response to the braking operation of the driver, the hydraulic pressure of the wheel cylinders is decreased, so that the braking torque is decreased. However, immediately after the driver cancels the braking operation, the hydraulic pressure of the wheel cylinders may not be decreased sufficiently and may remain at wheel cylinders. In a case in which the hydraulic pressure of the wheel cylinders remains at wheel cylinders immediately after the driver cancels the braking operation, the braking torque is generated by the remaining hydraulic pressure. Therefore, when the automatic drive control is executed in such a condition so that the vehicle speed reaches the target vehicle speed, the driving torque generated by the engine is higher than a condition in which the hydraulic pressure of wheel cylinders does not remain at the wheel cylinders. Accordingly, when the hydraulic pressure of the wheel cylinders does not remain (i.e. when the hydraulic pressure of the wheel cylinders is removed) after the driver cancels the braking operation, the braking torque reaches zero, and the increasing driving torque may result in that the vehicle speed exceeds the target vehicle speed and the vehicle suddenly accelerates.

A need thus exists for a vehicle drive control device which is not susceptible to the drawback mentioned above.

SUMMARY OF THE INVENTION

According to an aspect of the present invention, a vehicle drive control device includes a target driving torque value control means for controlling a target value of a driving torque, generated by a driving torque generator, based on a control signal, a target braking torque value control means for controlling a target value of a braking torque, generated by a braking torque generator by an application of a hydraulic pressure, based on the control signal and/or based on a braking operation of a driver, and an automatic drive control means for controlling the target driving torque value control means and the target braking torque value control means through the control signals the automatic drive control means executing an automatic drive control by sending the control signal to the target driving torque value control means and the target braking torque value control means in order to execute a feedback control on a present vehicle speed of the vehicle so that a vehicle speed deviation between the present vehicle speed and a predetermined target vehicle speed reaches zero, and the automatic drive control means continuously executing the automatic drive control regardless of the braking operation of the driver during the automatic drive control and a cancellation of the braking operation of the driver during the automatic drive control, wherein the target driving torque value control means controls the target value of all actual driving torque to be smaller than a presumed target value of the driving torque calculated by presuming the target value of the braking torque to be zero, for a predetermined time after the cancellation of tire braking operation of the driver.

According to another aspect of the present invention, a vehicle drive control device includes a target driving torque value control means for controlling a target value of a driving torque, generated by a driving torque generator, based on a control signal, a target braking torque value control means for controlling a target value of a braking torque, generated by a braking torque generator by an application of a hydraulic pressure, based on the control signal and/or based on a braising operation of a driver, and an automatic drive control means for controlling the target driving torque value control means and the target braking torque value control means through the control signal, the automatic drive control means executing an automatic drive control by sending the control signal to the target driving torque value control means and the target braking torque value control means in order to execute a feedback control on a present vehicle speed of the vehicle so that a vehicle speed deviation between the present vehicle speed and a predetermined target vehicle speed reaches zero, and the automatic drive control means continuously executing the automatic drive control regardless of the braking operation of the driver during the automatic drive control and a cancellation of the braking operation of the driver during the automatic drive control, wherein the target driving torque value control means controls the target value of all actual driving toque increase for a predetermined time to be smaller than the target value of a presumed driving torque increase for the predetermined time, calculated by presuming the target value of the braking torque to be zero, during a predetermined time after the cancellation of the braking operation of the driver.

According to another aspect of the invention, a method for vehicle drive control includes a target driving torque value control method for controlling a target value of a driving torque, generated by a driving torque generator, based on a control signal, a target braking torque value control method for controlling a target value of a braking torque, generated by a braking torque generator by an application of a hydraulic pressure, based on the control signal and/or based on a braking operation of a driver, and an automatic drive control method for controlling the target driving torque value control method and the target braking torque value control method through the control signal, the automatic drive control method executing an automatic drive control by sending the control signal to the target driving torque value control method and the target braking torque value control method in order to execute a feedback control on a present vehicle speed of the vehicle so that a vehicle speed deviation between the present vehicle speed and a predetermined target vehicle speed reaches zero, and the automatic drive control method continuously executing the automatic drive control regardless of the braking operation of the driver during the automatic drive control and a cancellation of the braking operation of the driver during the automatic drive control, wherein the target driving torque value control method controls the target value of an actual driving torque to be smaller than a presumed target value of the driving torque calculated by presuming the target value of the braking torque to be zero, for a predetermined time after the cancellation of the braking operation of the driver.

According to another aspect of the present invention, a method for vehicle drive control includes a target driving torque value control method for controlling a target value of a driving torque, generated by a driving torque generator, based on a control signal, a target braking torque value control method for controlling a target value of a braking torque, generated by a braking torque generator by an application of a hydraulic pressure, based on the control signal and/or based on a braking operation of a driver, and an automatic drive control method for controlling the target driving torque value control method and the target braking torque value control method through the control signal, the automatic drive control method executing an automatic drive control by sending the control signal to the target driving torque value control method and the target braking torque value control method in order to execute a feedback control on a present vehicle speed of the vehicle so that a vehicle speed deviation between the present vehicle speed and a predetermined target vehicle speed reaches zero, and the automatic drive control method continuously executing the automatic drive control regardless of the braking operation of the driver dining the automatic drive control and a cancellation of the braking operation of the driver during the automatic drive control, wherein the target driving torque value control method controls the target value of an actual driving toque increase for a predetermined time to be smaller than the target value of a presumed driving torque increase for the predetermined time, calculated by presuming the target value of the braking torque to be zero, during a predetermined time after the cancellation of the braking operation of the driver.

BRIEF DESCRIPTION OF THE DRAWINGS

The foregoing and additional features and characteristics of the present invention will become more apparent from the following detailed description considered with the reference to the accompanying drawings, wherein:

FIGS. 3A, 3B and 3C are diagrams for explaining an operation of the vehicle drive control device according to the embodiment.

DETAILED DESCRIPTION

Figure 1:
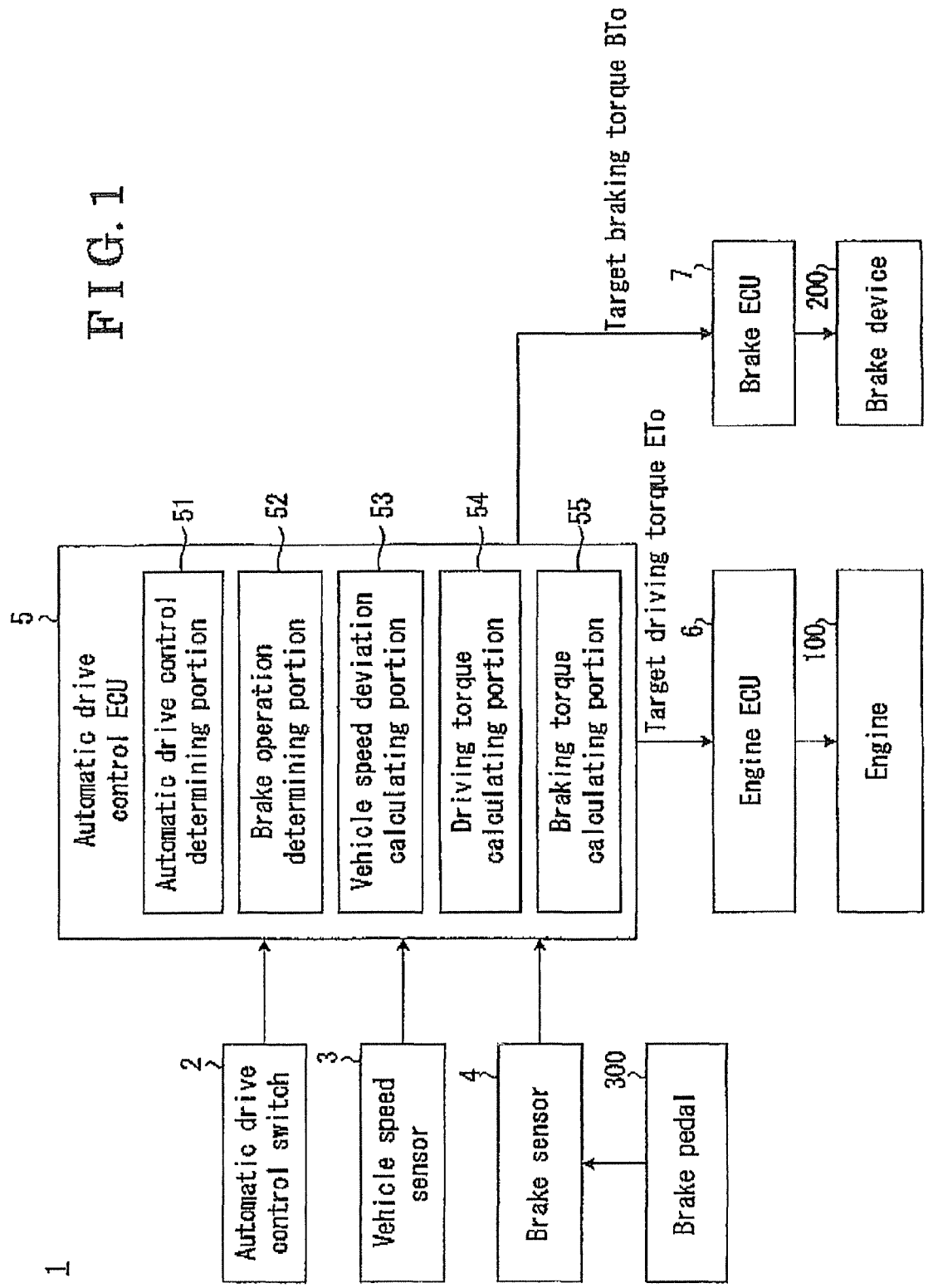
FIG. 1 illustrates a configuration of a vehicle drive control device according to an embodiment.

FIG. 1 illustrates a structure of a vehicle drive control device 1 (serving also as a method for vehicle drive control) according to the embodiment as an example. As illustrated in FIG. 1, the vehicle drive control device 1 according to the embodiment is adapted to a vehicle (which is not illustrated and is referred to as a vehicle C hereinbelow) and the vehicle drive control device 1 executes all automatic drive control so that a vehicle speed V of the vehicle C reaches a target vehicle speed Vo. Further, the vehicle drive control device 1 includes an automatic drive control switch 2, vehicle speed sensors 3, brake sensors 4, an automatic drive control ECU 5 (serving as an automatic drive control device or as an automatic drive control method), all engine ECU 6 and a brake ECU 7.

A reference numeral 100 indicates an engine that serves as a driving torque generator generating a driving torque ET and applying the generated driving torque ET to the vehicle C. The engine 100 is controlled by the engine ECU 6 based on a target driving torque ETo calculated by the automatic drive control ECU 5 so that the engine 100 applies the driving torque ET to the vehicle C. A reference numeral 200 indicates a brake device that serves as a braking torque generator generating a braking torque BT and applying the generated brake torque BT to the vehicle C. The brake device 200 generates the braking torque BT by an application of a hydraulic pressure and applies the generated brake torque BT to the vehicle C. The brake device 200 includes, for example, a hydraulic pressure control circuit, wheel cylinders, pads, and rotors that integrally rotate with wheels of the vehicle C. The pads are arranged so as to face the corresponding rotors. The wheel cylinders contact the pads with rotors, respectively, by the hydraulic pressure which flows from the hydraulic control circuit. When the pads contact the corresponding rotors, friction is generated therebetween and the friction serves as the braking torque BUT of braking force for braking the vehicle C. Based on the target braking torque BTo calculated by the automatic drive control ECU 5, the brake ECU 7 controls the hydraulic pressure control circuits for example, and then the brake device 200 applies the braking torque BT to the vehicle C. A reference numeral 300 indicates a brake pedal operated by a driver. The brake pedal 300 is provided at an interior of the vehicle C. When the driver depresses the brake pedal 300, a braking operation is executed and when the driver releases the brake pedal to an original position, the braking operation is canceled. Further, the engine 100 generates the driving torque ET based on an accelerating operation of the driver. More specifically, the engine 100 generates the driving torque BT based on an amount of depression of an accelerator by the driver. The brake device 200 generates the braking torque BT based on the braking operation of the driver. More specifically, the brake device 200 generates the braking torque BT by controlling the hydraulic pressure of the wheel cylinders by the hydraulic pressure control circuit, based on an amount of depression of the brake pedal 300 by the driver.

The automatic drive control switch 2 functions as a control starting trigger. The automatic drive control switch 2 is provided at the interior of the vehicle C and is switched on when the driver operates the same. The automatic drive control switch 2 is connected to the automatic drive control ECU 5 and when the drivel manually switches such switch ON, the automatic drive control switch 2 outputs an ON signal to the automatic drive control ECU 5. Thus, the automatic drive control switch 2 functions as the control sty trigger which actuates the automatic drive control. Further, the automatic drive control switch 2 sets the target vehicle speed Vo of the automatic drive control. The driver may set the target vehicle speed Vo of the vehicle C by operating the automatic drive control switch 2.

The vehicle speed sensors 3 detect the vehicle speed V of the vehicle C. The vehicle speed sensors 3 are connected to the automatic drive control ECU 5 and the detected vehicle speed V of the vehicle C is output to the automatic drive control ECU 5. The vehicle speed sensors 3 are, for example, vehicle wheel speed sensors provided at each of the wheels of the vehicle C. In such a case, each wheel speed $v1$, $v2$, $v3$ and $v4$ detected by the vehicle wheel sensors of the vehicle speed sensors 3 is output to the automatic drive control ECU 5 and the automatic drive control ECU 5 calculates the vehicle speed V of the vehicle C on the basis of each output wheel speed $v1$, $v2$, $v3$ and $v4$.

The brake sensors 4 are braking operation detecting means which detect the braking operation of the driver. The brake sensors 4 detect whether the driver executes the braking operation or the driver cancels the braking operation, in other words, the brake sensors 4 detect an ON/OFF state of the brake. For example, the brake sensors 4 include a brake switch sensor which detects the ON/OFF state of the brake pedal 300, a master cylinder pressure sensor which detects the hydraulic pressure of a master cylinder that configures the hydraulic pressure control circuit, a depression force sensor which detects depressing force of the brake pedal 300 generated by the driver, a stroke sensor which detects a depressing amount of the brake pedal 300 by the driver and the like. The brake sensors 4 are connected to the automatic drive control ECU 5 and the detected braking operation of the driver, in other words, the detected ON/OFF state of the brake is output to the automatic drive control ECU 5.

The automatic drive control ECU 5 calculates the target driving torque ETo and the target braking torque BTo so that the vehicle speed V reaches the target vehicle speed Vo and outputs the calculated target driving torque ETo and target braking torque BTo to the engine ECU 6 and the brake ECU 7, respectively. The automatic drive control ECU 5 controls the engine 100 via the engine ECU 6 based on the target driving torque ETo and also controls the brake device 200 via the brake ECU 7 based on the target braking torque BTo. In other words, the automatic drive control ECU 5 coordinately controls the engine 100 and the brake 200 so that the vehicle speed V reaches the predetermined target vehicle speed Vo. Further, the automatic drive control ECU 5 executes the automatic drive control when the driver cancels the braking operation, regardless of the acceleration operation of the driver. More specifically, the automatic drive control ECU 5 calculates the target driving torque ETo and the target braking torque BTo so that the vehicle speed V reaches the target vehicle speed Vo and outputs the calculated target driving torque ETo and target braking torque BTo to the engine ECU 6 and the brake ECU 7, respectively, when the driver cancels the braking operation, regardless of the acceleration operation of the driver. The automatic drive control ECU 5 includes an automatic drive control determining portion 51 (which serves as an automatic drive control means or as an automatic drive control method), a braking operation determining portion 52 (which serves as an automatic drive control means or as an automatic drive control method), a vehicle speed deviation calculating portion 53 (which serves as an automatic drive control means or as an automatic drive control method), a driving torque calculating portion 54 (which serves as a target driving torque value control means or as a target driving torque value control method) and a braking torque calculating portion 55 (which serves as a target braking torque value control means or as a target braking torque value control method). A known configuration is adapted to a hardware configuration of the automatic drive control ECU 5, therefore, a description thereof is not provided. Further, the target driving torque Vo is a value by which the vehicle C may be driven off road at a low speed, and is set to be equal to or less than 10 km/h.

The automatic drive control determining portion 51 determines the driver's intention to start the automatic drive control. The automatic drive control determining portion 51 determines whether or not to start the automatic drive control on the basis of the operation of the automatic drive control switch 2 by the driver, more specifically on the basis of whether or not the ON signal is outputted by the driver, switching on the automatic drive control switch 2, in other words, the automatic drive control determining portion 51 determines whether to start or not to start the automatic drive control based on an ON/OFF state of the automatic drive control switch 2.

The braking operation determining portion 52 determines the braking operation of the driver. The braking operation determining portion 52 determines whether or not the driver cancels the braking operation after the driver executes the braking operation, by means of the brake sensors 4 while the automatic drive control is executed, in other words the braking operation determining portion 52 determines whether or not the brake is released to be in the OFF state from the ON state.

The vehicle speed deviation calculating portion 53 calculates a vehicle speed deviation $\Delta V$ between the target vehicle speed Vo and the vehicle speed V of the vehicle C. The vehicle speed deviation calculating portion 53 calculates a vehicle speed deviation $\Delta V$ by subtracting the vehicle speed V of the vehicle C, which is detected by the vehicle speed sensors 3, from the target vehicle speed Vo (i.e. the vehicle speed deviation calculation portion 53 calculates the vehicle speed deviation $\Delta V$ on the basis of the following equation: $\Delta V = Vo - V$).

The driving torque calculating portion 54 calculates the target driving torque ETo which the engine 100 generates. The driving torque calculating portion 54 calculates the target driving torque ETo so that the vehicle speed V of the vehicle C reaches the predetermined target vehicle speed Vo. In the embodiment, the driving torque calculating portion 54 calculates a present target torque ETo (n) by adding a target driving torque ETo (n−1) which is calculated previously and the vehicle speed deviation ΔV which is multiplied by a gain G (i.e. the driving torque calculating portion 54 calculates the present target torque Eto (n) on the basis of the following equation: ETo(n)=ETo(n−1)+G×ΔV). In other words, the driving torque calculating portion 54 calculates the target driving torque ETo in order to execute a feedback control based on the vehicle speed deviation ΔV. Therefore, the gain G is a feedback gain value. Further, when the braking operation determining portion 52 determines that the brake is in the ON state, the driving torque calculating portion 54 calculates the target driving torque ETo which is smaller than the driving torque ETo which is calculated so that the vehicle speed V of the vehicle C reaches the predetermined target vehicle speed Vo. In other words, the driving torque calculating portion 54 controls the actual target driving torque ETo to be smaller than an estimated presumed target driving torque ETo calculated by presuming the target braking torque BTo to be zero. In the embodiment, when the braking operation determining portion 52 determines that the brake is in the ON state, the driving torque calculating portion 54 calculates the present target driving torque ETo (n) to be zero (i.e. ETo(n)=0).

The braking torque calculating portion 55 calculates the target brig torque BTo which the brake device 200 generates. The braking torque calculating portion 55 calculates the target driving torque ETo so that the vehicle speed V of the vehicle C reaches the predetermined target vehicle speed Vo.

The engine ECU 6 controls the engine 100 based on the target driving torque ETo. The engine ECU 6 is connected to the automatic drive control ECU 5 and controls the engine 100 to generate the driving torque ET based on the target driving torque ETo which is calculated by and output from the automatic driving control ECU 5. Further, the engine ECU 6 is connected to an acceleration sensor which detects the amount of depression of the accelerator operated by the driver so as to accelerate the vehicle speed V and the engine ECU 6 controls the engine 100 based on the detected amount of the depression, so that the engine 100 generates the driving torque ET based on the accelerating operation of the driver.

The brake ECU 7 controls the brake device 200 based on the target braking torque BTo. The brake ECU 7 is connected to the automatic drive control ECU 5 and controls the brake device 200 to generate the braking torque BT based on the target braking torque BTo which is calculated by and output from the automatic driving control ECU 5. Further, the brake device 200 is configured so as to apply braking torques BTW1, BTW2, BTW3 and BTW4 to the corresponding vehicle wheels. The brake ECU 7 controls the brake device 200 based on target braking torques BTWo1, BTWo2, BTWo3 and BTWo4, which are calculated by and output from the automatic drive control ECU 5 relative to each wheel, so that the brake device 200 applies the braking torques BTW1, BTW2, BTW3 and BTW4 to the corresponding vehicle wheels, thereby applying the braking torque BT to the vehicle C.

Figure 2:
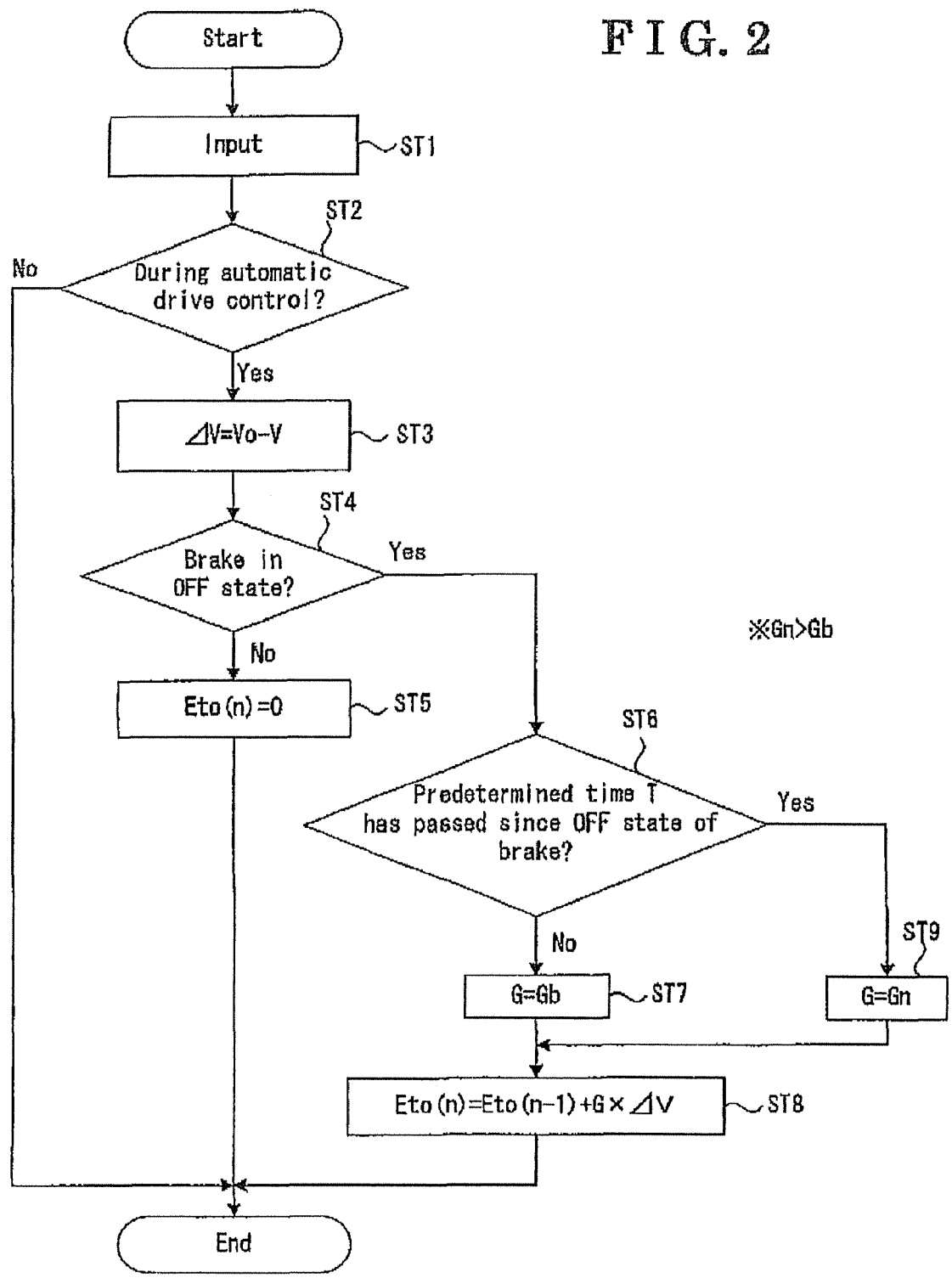
FIG. 2 is a flow chart illustrating a flow of an automatic drive control executed by the vehicle drive control device according to the embodiment.

The automatic drive control executed by the vehicle drive control device 1 according to the embodiment is described hereinbelow. FIG. 2 is a flow chart illustrating a flow of the automatic drive control executed by the vehicle drive control device 1 according to the embodiment. FIGS. 3A, 3B and 3C are diagrams for explaining an operation of the vehicle drive control device 1 according to the embodiment. A method of the automatic drive control executed by the vehicle drive control device 1 in respect of the relationship between the automatic drive control ECU 5 and the engine ECU 6 after the driver cancels Me braking operation is described hereinbelow. The automatic drive control by the vehicle drive control device 1 is executed in each control cycle.

As illustrated in FIG. 2, the automatic drive control ECU 5 executes an input process (ST 1). In ST1, the automatic drive control ECU 5 obtains an ON/OFF state of the automatic drive control switch 2, the vehicle speed V detected by and output from the vehicle speed sensors 3, the ON/OFF state of the brake detected by the brake sensors 4, the target vehicle speed Vo set by the driver and the like.

The automatic drive control determining portion 51 of the automatic drive control ECU 5 determines whether or not the automatic drive control is executed (ST2). The automatic drive control determining portion 51 determines the intention of starting the automatic drive control by the driver based on the obtained ON/OFF state of the automatic drive control switch 2. When determining that the automatic drive control switch 2 is in the OFF state (No in ST2), the automatic drive control determining portion 51 ends the automatic drive control and proceeds to the next control cycle.

When the automatic drive control determining portion 51 determines that the automatic drive control is under the executed condition (Yes in ST2), the vehicle speed deviation calculating portion 53 of the automatic drive control ECU 5 calculates the vehicle speed deviation ΔV (ST3). The vehicle speed deviation calculating portion 53 calculates the vehicle deviation ΔV based on the obtained target vehicle speed Vo and the obtained vehicle speed V, on the basis of the following equation: ΔV=Vo−V.

The braking operation determining portion 52 of the automatic drive control ECU 5 determines whether or not the brake is in the OFF state (ST4). The braking operation determining portion 52 determines whether or not the driver cancels the braking operation after the driver executes the braking operation while the automatic drive control is executed, on the basis of the ON state of the automatic drive control switch 2 and the ON/OFF state of the brake detected by the brake sensors 4. In other words, the braking operation determining portion 52 determines whether or not the vehicle C is under a decelerating condition or under a stopping condition in response to the braking operation of the driver.

When the braking operation determining portion 52 determines that the brake is in the ON state (NO in ST4), the automatic drive control ECU 5 proceeds to a next step where the driving torque calculating portion 54 of the automatic drive control BCU 5 sets the present target driving torque ETo (n) to be zero (ST5). In a case where the driver executes the braking operation, in other words, the vehicle C is under the decelerating condition or under the stopping condition, the driving torque calculating portion 5 sets the present target driving torque ETo (n) to be zero in ST5. Accordingly, the engine ECU 6 controls the engine 100 not to generate the driving torque ET. In other words, in a case where the braking device 200 generates the braking torque by the braking operation of the driver while the automatic drive control is executed, the engine ECU 6 controls the engine 100 not to generate the driving torque ET. Therefore, even while the automatic drive control is executed, the driver may decelerate or stop the vehicle C by performing the braking operation which results in the braking device 200 generating the braking torque BT. After calculating the present driving torque ETo (n), the automatic drive control ECU 5 ends the automatic drive control and proceeds to the next control cycle.

Further, after the braking operation determining portion 52 determines that the brake is in the OFF state (Yes in ST4), the driving torque calculating portion 54 determines whether or not a predetermined time T has passed since the brake was released to be in the OFF state. More specifically, the driving torque calculating portion 54 determines whether or not the predetermined time T has passed since the driver canceled the braking operation after the braking operation was executed by the driver while the automatic drive control was executed. In other words, the driving torque calculating portion 54 determines whether or not the predetermined time T has passed since the vehicle C is turned to be in an acceleration state by the automatic drive control from the deceleration or stopping conditions, based on the braking operation of the driver. The predetermined time T is set to progress until the braking torque is not generated by the brake device 200 based on the braking operation of the driver. Therefore, time from when the driver cancels the braking operation after the braking operation is executed until when the hydraulic pressure of the wheel cylinders is completely removed, pads and rotors do not contact each other and the friction is not generated thereat, is set to be the predetermined time T.

When determining that the predetermined time T has not passed since the brake was released to be in the OFF state (No in ST6), the driving torque calculating portion 54 sets the gain G as a limited gain Gb (ST7). In a case where the hydraulic pressure of the wheel cylinders may remain and the bring toque BT may be generated, the driving torque calculating portion 54 sets the gain G for multiplying the vehicle speed deviation $\Delta V$ as the limited gain G whose value is smaller than the normal gain Gn (i.e. G=Gb). In other words, an increasing amount of the driving torque ET while the predetermined time T progresses after the brake is released to be in the OFF state is set to be smaller than an increasing amount of the driving torque after an elapse of the predetermined time T.

The automatic drive control ECU 5 proceeds to a next step where the driving torque 54 calculates the present target driving torque ETo (n) (ST8). The driving torque calculating portion 54 calculates the present target driving torque ETo (n) based on the previous target driving torque ETo (n−1), the vehicle speed deviation $\Delta V$ which is calculated by the vehicle speed deviation calculating portion 53, and the gain G which is set as the limited gain Gb (i.e. the driving torque calculating portion 54 calculates the present target driving torque ETo on the basis of the following equation: ETo(n)=ETo(n−1)+G(=Gb)×$\Delta V$). The engine ECU 6 controls the engine 100 based on the present target driving torque ETo (n) calculated by the driving torque calculating portion 54, so that the engine 100 generates the present driving torque ET (n). After calculating the present target driving torque ETo (n), the automatic drive control ECU 5 ends the automatic drive control and proceeds to the next control cycle. Therefore, while the predetermined time T progresses after the brake was released to be in the OFF state, the gain G is repeatedly set as the limited gain Gb and the present target torque ETo (n) is repeatedly calculated based on the limited gain Gb.

When determining that the predetermined time T has passed since the brake was released to be in the OFF state (Yes in ST6), the driving torque calculating portion 54 sets the gain G as the normal gain Gn (ST9). More specifically, in a case where the hydraulic pressure of the wheel cylinders is completely removed and the braking torque BT is not generated, the driving torque calculating portion 54 sets the gain G for multiplying the vehicle speed deviation $\Delta V$ as the normal Gn whose value is larger than the limited gain Gb (i.e. G=Gn).

The automatic drive control ECU 5 proceeds to a next step where the driving torque 54 calculates the present target driving torque ETo (n) (ST8). The driving torque calculating portion 54 calculates the present target driving torque ETo (n) based on the previous target driving torque ETo (n−1), the vehicle speed deviation $\Delta V$ which is calculated by the vehicle speed deviation calculating portion 53, and the gain G which is set as the normal gain Gn (i.e. the driving torque calculating portion 54 calculates the present target driving torque ETo on the basis of the following equation: ETo(n)=ETo(n−1)+G(=Gn)×$\Delta V$). The engine ECU 6 controls the engine 100 based on the present target driving torque ETo (n) calculated by the driving torque calculating portion 54, so that the engine 100 generates the present driving torque ET (n). After calculating the present target driving torque ETo (n), the automatic drive control ECU 5 ends the automatic drive control and proceeds to the next control cycle. Therefore, until when the brake is depressed to be in the ON state from the OFF state, the gain G is repeatedly set as the normal gain Gn and the present target torque ETo (n) is repeatedly calculated based on the normal gain Gn.

As described above, the vehicle drive control device 1 according to the embodiment executes the automatic drive control in response to the cancellation of the braking operation of the driver, regardless of the accelerating operation of the driver. The automatic drive control is executed so that the gain G is set as the limited gain Gb, which is smaller than the normal gain Gn, during the predetermined the T after the braking operation is performed and then is cancelled by the driver. Therefore, as illustrated in FIGS. 3A, 3B and 3C, the target driving torque ETo calculated by the driving torque calculating portion 54 is controlled so that the driving torque ET (which is illustrated with a solid line in FIG. 3C), which is generated by the engine 100 based on the target driving torque ETo (where the gain G is set as the limited gain Gb) calculated while the predetermined time T progresses after the brake is released to be in the OFF state, is set to be smaller than the driving torque ET (which is illustrated with a dashed line in FIG. 3C), which is generated by the engine 100 based on the target driving torque ETo (where the gain G is set as the normal gain Gn) by which the vehicle speed V is controlled to reach the target vehicle speed Vo. Accordingly, in a case where the braking operation is cancelled by the driver, in other words, in a case where the brake is released to be in the OFF state, even though the hydraulic pressure of the wheel cylinders still remains thereat and the braking torque BT (which is illustrated in a solid line in FIG. 3B) is still generated, during the predetermined time T, the driving torque ET generated by the engine 100 is controlled to be smaller than the driving torque ET by which the vehicle speed V is controlled to reach the target vehicle speed Vo. Therefore, the driving torque ET generated by the engine 100 is prevented from exceeding the driving torque ET by which the vehicle speed V is controlled to reach the target vehicle speed Vo in a case where the hydraulic pressure of the wheel cylinders does not remain immediately after the braking operation is cancelled by the driver. As a result, compared to the vehicle speed V (which is illustrated with a dashed line in FIG. 3A) of the vehicle C in a conventional automatic drive control executed by the vehicle drive control device, even though the hydraulic pressure of the wheel cylinders is completely removed and the braking torque BT reaches zero after the driver cancels the braking operation, the vehicle speed V (which is illustrated with a solid line in FIG. 3A) of the vehicle C in the automatic drive control executed by the vehicle drive control device 1 according to the embodiment is prevented from exceeding the target torque Vo, and the vehicle C according to the embodiment is prevented from suddenly accelerating. In the conventional automatic drive control, even if the driving torque ET is generated by the engine 100 based on the target driving torque ETo which is set in accordance with the vehicle speed deviation $\Delta V$, the hydraulic pressure remains at the wheel cylinders as described above, therefore, an increasing amount of the vehicle speed V is reduced. In such a case, the vehicle speed deviation ΔV stays large, so that the engine 100 is controlled so as to generate the driving torque ET based on the further large target driving torque ETo. Accordingly, the vehicle speed V becomes overly greater relative to the target vehicle speed Vo because the target driving torque ETo, when the remaining hydraulic pressure is completely removed, is too large. However, in the vehicle drive control device 1 according to the embodiment, the gain G during the predetermined time T is set as the limited gain Gb whose value is smaller than the normal gain Gn, therefore, the drawback mentioned above regarding the conventional vehicle drive control device is eliminated. Further, according to the vehicle drive control device 1 of the embodiment, a hydraulic pressure sensor which detects the hydraulic pressure of the wheel cylinder may not need to be provided at each wheel cylinder of the vehicle C, therefore, cost for manufacturing the vehicle drive control device 1 is reduced.

Further, in the embodiment described above, the predetermined time T is set to progress until the braking torque BT is not generated by the brake device 200. However, the present invention is not limited to the embodiment described above. The predetermined time T may be set to progress between when the wheels of the vehicle C start to rotate from a state where the wheels are not rotated, in a case where the vehicle C is stopped by the braking operation of the driver.

Accordingly, the vehicle drive control device 1 according to the embodiment of the present invention is adaptable for a vehicle drive control device which executes an automatic drive control in which a driving torque generated by a driving torque generator is controlled so that a vehicle speed of a vehicle, which has a braking device for generating the braking torque by the application of a hydraulic pressure at least based on a braking operation of a driver, is controlled to reach a predetermined vehicle speed. The automatic drive control device according to the embodiment is suited to prevent the vehicle from suddenly accelerating after the driver cancels the braking operation.

According to the embodiment, the feedback control of the automatic drive control is executed in a case where the braking operation is canceled by the driver while the vehicle is in a stopping condition by means of the brake device 200 based on the braking operation of the driver.

According to the embodiment, the predetermined time T refers to a time elapsing until the braking torque, which is generated by the brake device 200, is completely removed after the cancellation of the braking operation of the driver.

Accordingly the vehicle drive control device 1 according to the present invention executes the automatic drive control in response to cancel of the braking operation of the driver, regardless of the accelerating operation of the driver. In the case where the hydraulic pressure still remains at the brake device and the braking torque BT is still generated immediately after the driver cancels the braking operation, the driving torque ET generated by the engine 100 is controlled to be smaller than the driving torque ET by which the vehicle speed V is controlled to reach the target vehicle speed Vo, during the predetermined time T after the cancellation of the braking operation of the driver. Therefore, the driving torque, generated by the engine 100 during the predetermined time T immediately after the driver cancels the braking operation, is prevented from exceeding the driving torque ET by which the vehicle speed V is controlled to reach the target vehicle speed Vo in a case where the hydraulic pressure of the wheel cylinders does not remain immediately after the braking operation is canceled by the driver. As a result, even though the hydraulic pressure is completely removed and the braking torque BT reaches zero after the driver cancels the braking operation, the vehicle V is prevented from exceeding the target vehicle speed Vo, and the vehicle C is prevented from suddenly accelerating.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the split of the present invention. Accordingly, it is expressly intended that all such variations, changes and equivalents which fall within the spirit and scope of the present invention as defined in the claims, be embraced thereby.

The invention claimed is:

1. A vehicle drive control device comprising:
a target driving torque value control means for controlling a target value of a driving torque, generated by a driving torque generator, based on a control signal;
a target braking torque value control means for controlling a target value of a braking torque, generated by a braking torque generator an application of a hydraulic pressure, based on the control signal and/or based on a braking operation of a driver; and
an automatic drive control means for controlling the target driving torque value control means and the target braking torque value control means through the control signal, the automatic drive control means executing an automatic drive control by sending the control signal to the target driving torque value control means and the target braking torque value control means in order to execute a feedback control on a present vehicle speed of the vehicle so that a vehicle speed deviation between the present vehicle speed and a predetermined target vehicle speed reaches zero, and
the automatic drive control means continuously executing the automatic drive control regardless of the braking operation of the driver during the automatic drive control and a cancellation of the braking operation of the driver during the automatic drive control, wherein
the target driving torque value control means controls the target value of an actual driving torque to be smaller than a presumed target value of the driving torque calculated by presuming the target value of the braking torque to be zero, for a predetermined time after the cancellation of the braking operation of the driver.

2. The vehicle drive control device according to claim 1, wherein the feedback control of the automatic drive control is executed in a case where the braking operation is canceled by the driver while the vehicle is in a stopping condition by means of the braking torque generator based on the braking operation of the driver.

3. The vehicle drive control device according to claim 1, wherein the predetermined time refers to a time elapsing until the braking torque, which is generated by the braking torque generator, is completely removed after the cancellation of the braking operation of the driver.

4. The vehicle drive control device according to claim 2, wherein the predetermined time refers to a time elapsing until the braking torque, which is generated by the braking torque generator, is completely removed after the cancellation of the braking operation of the driver.

5. A vehicle drive control device comprising:
a target driving torque value control means for controlling a target value of a driving torque, generated by a driving torque generator, based on a control signal;

a target braking torque value control means for controlling a target value of a braking torque, generated by a braking torque generator by an application of a hydraulic pressure, based on the control signal and/or based on a braking operation of a driver; and an automatic drive control means for controlling the target driving torque value control means and the target braking torque value control means through the control signal, the automatic drive control means executing an automatic drive control by sending the control signal to the target driving torque value control means and the target braking torque value control means in order to execute a feedback control on a present vehicle speed of the vehicle so that a vehicle speed deviation between the present vehicle speed and a predetermined target vehicle speed reaches zero, and the automatic drive control means continuously executing the automatic drive control regardless of the braking operation of the driver during the automatic drive control and a cancellation of the braking operation of the driver during the automatic drive control, wherein the target driving torque value control means controls the target value of an actual driving torque increase for a predetermined time to be smaller than the target value of a presumed driving torque increase for the predetermined time, calculated by presuming the target value of the braking torque to be zero, during a predetermined time after the cancellation of the braking operation of the driver.

6. The vehicle drive control device according to claim 5, wherein the feedback control of the automatic drive control is executed in a case where the braking operation is canceled by the driver while the vehicle is in a stopping condition by means of the braking torque generator based on the braking operation of the driver.

7. The vehicle drive control device according to claim 6, wherein the predetermined time refers to a time elapsing until the braking torque, which is generated by the braking torque generator, is completely removed after the cancellation of the braking operation of the driver.

8. The vehicle drive control device according to claim 5, wherein the predetermined time refers to a time elapsing until the braking torque, which is generated by the braking torque generator, is completely removed after the cancellation of the braking operation of the driver.

9. A method for vehicle drive control comprising:
controlling a target value of a driving torque, generated by a driving torque generator, based on a control signal;
controlling a target value of a braking torque, generated by a braking torque generator by an application of a hydraulic pressure, based on the control signal and/or based on a braking operation of a driver;
executing an automatic drive control by sending the control signal to execute a feedback control on a present vehicle speed of the vehicle so that a vehicle speed deviation between the present vehicle speed and a predetermined target vehicle speed reaches zero,
continuously executing the automatic drive control regardless of the braking operation of the driver during the automatic drive control and a cancellation of the braking operation of the driver during the automatic drive control; and
controlling the target value of an actual driving torque to be smaller than a presumed target value of the driving torque calculated by presuming the target value of the braking torque to be zero, for a predetermined time after the cancellation of the braking operation of the driver.

10. A method for vehicle drive control comprising:
controlling a target value of a driving torque, generated by a driving torque generator, based on a control signal;
controlling a target value of a braking torque, generated by a braking torque generator by an application of a hydraulic pressure, based on the control signal and/or based on a braking operation of a driver;
executing an automatic drive control by sending the control signal to execute a feedback control on a present vehicle speed of the vehicle so that a vehicle speed deviation between the present vehicle speed and a predetermined target vehicle speed reaches zero,
continuously executing the automatic drive control regardless of the braking operation of the driver during the automatic drive control and a cancellation of the braking operation of the driver during the automatic drive control; and
controlling the target value of an actual driving torque increase for a predetermined time to be smaller than the target value of a presumed driving torque increase for the predetermined time, calculated by presuming the target value of the braking torque to be zero, during a predetermined time after the cancellation of the braking operation of the driver.

* * * * *